United States Patent [19]

Sterzel et al.

[11] Patent Number: 4,711,907

[45] Date of Patent: Dec. 8, 1987

[54] MEMBRANES OF SUBSTANTIALLY NON-CROSSLINKED ORGANIC POLYMERS WHICH CONTAIN BONDED IONOGENIC GROUPS

[75] Inventors: Hans-Josef Sterzel, Dannstadt-Schauernheim; Axel Sanner, Frankenthal, both of Fed. Rep. of Germany

[73] Assignee: BASF Aktiengesellschaft, Fed. Rep. of Germany

[21] Appl. No.: 705,718

[22] Filed: Feb. 26, 1985

[30] Foreign Application Priority Data

Mar. 2, 1984 [DE] Fed. Rep. of Germany ....... 3407719

[51] Int. Cl.$^4$ .............................................. C08P 5/20
[52] U.S. Cl. ...................................... 521/27; 521/28; 521/30
[58] Field of Search ............................. 521/30, 27, 28

[56] References Cited

U.S. PATENT DOCUMENTS

| | | | |
|---|---|---|---|
| 4,116,889 | 9/1978 | Chlanda et al. | 521/27 |
| 4,567,206 | 1/1986 | Matsui | 521/27 |
| 4,616,041 | 10/1986 | Sterzel et al. | 521/27 |

FOREIGN PATENT DOCUMENTS

| | | | |
|---|---|---|---|
| 3130040 | 2/1983 | Fed. Rep. of Germany | |
| 3319255 | 9/1984 | Fed. Rep. of Germany | 54/32 |
| 1501819 | 2/1978 | United Kingdom | |
| 2047564 | 12/1980 | United Kingdom | |

OTHER PUBLICATIONS

"Makremolekulare Chmie, Rapid Commun.", Band 1, 1980, S-297-302.
"Messung elektrochemischer Eigenschaften von Ionenaustauschermembranen", GKSS-Bericht 74/E/13, 1974 v. K Hattenbach u. K.Kneifel.

Primary Examiner—Peter F. Kulkosky
Attorney, Agent, or Firm—Keil & Weinkauf

[57] ABSTRACT

A membrane of substantially non-crosslinked organic polymers which contain ionogenic groups bonded to the polymer chain via an alkylene radical, at intervals of not less than 4 carbon atoms.

7 Claims, No Drawings

MEMBRANES OF SUBSTANTIALLY NON-CROSSLINKED ORGANIC POLYMERS WHICH CONTAIN BONDED IONOGENIC GROUPS

Cation and anion exchange membranes are successfully employed in electrodialysis installations for separating out or concentrating electrolytes. Examples include the desalination of brackish water, the concentration of common salts from brine, the desalination of industrial effluent, the desalination of foodstuffs and the removal of salts from reaction solutions in which the desired products are neutral.

Though ion exchange membranes have been used in electrodialysis for a considerable time, the membranes suffer from some serious disadvantages. First, the prior art membranes present a relatively high electrical resistance to ion flux. The energy yield of the process decreases linearly with increasing resistance. Due to this energy loss, electrodialysis processes employing such membranes are ruled out in many sectors of industry. Prior art membranes are described in, for example, German Published Applications DOS 2,737,131 and DOS 2,910,793.

Secondly, the known membranes are insuffficiently heat-stable. Due to the resistance, the potential drop is converted to heat in the membrane, raising the temperature of the latter.

Conventional ion exchange membranes are as a rule crosslinked polystyrenes which contain solfonic acid groups or quaternary ammonium groups. Copolymers based on acrylonitrile/methallylsulfonate or vinylpyridine, as well as chlorosulfonated polysulfones, are also employed for the preparation of ion exchange membranes.

It is an object of the present invention to provide membranes possessing ionogenic groups, which ensure a high energy yield, are heat-stable and can be produced by thermoplastic processing methods.

We have found that this object is achieved by membranes of substantially non-crosslinked organic polymers which contain ionogenic groups bonded to the polymer chain via an alkylene radical, at intervals of not less than 4 carbon atoms.

The novel membranes have the advantage that they permit a high energy yield and have a lower resistance, permitting higher membrane throughput.

Advantageously, the organic polymers are very resistant to acids and bases. Polymers softening above 80° C. have proven particularly suitable. Examples of suitable matrix polymers are polystyrene, aromatic polysulfones, aromatic polyether-sulfones, polyphenylene ethers and aromatic polyether-ketones. The polymers are substantially non cross-linked so that they can be processed by thermoplastic methods. Particularly preferred polymers are polysulfones and polyether-sulfones.

Ionogenic groups are bonded to the polymer chain via an alkylene radical, at intervals of not less than 4 carbon atoms. The alkylene radicals may be linear or branched and, particularly advantageously, have from 6 to 22 carbon atoms, especially from 6 to 14 carbon atoms. Since the ionogenic groups are agvantageously in the terminal position, their spacing from the polymer chain is preferably not less than 6 carbon atoms. It is particularly preferred that the alkylene chains are bonded to aromatic structural elements of the organic polymer.

Advantageously, the alkylene radicals containing the ionogenic groups differ in polarity and solubility parameters from the organic polymer to which they are bonded. The difference in solubility parameter of the structural elements of the polymer and of the side chain should be not less than 1 Joule ½ cm 3/2.

Preferred ionogenic groups which are bonded via alkylene radicals to the organic polymer are tertiary amino groups or quaternary ammonium groups, carboxyl groups and sulfonic acid groups. If the membrane is to be used as a cation exchanger it advantageously contains sulfonic acid groups or carboxyl groups in a concentration of from 0.1 to 5 equivalents per kg of polymer, preferably from 0.3 to 3 equivalents per kg of polymer. If the membranes are to be used as anion exchangers, they advantageously contain, as ionogenic groups, tertiary amines or quaternary ammonium groups with $C_1$–$C_4$-alkyl radicals, especially trimethylammonium groups, advantageously at a concentration of from 0.1 to 5 equivalents, preferably from 0.3 to 3 equivalents, per kg of polymer.

The alkylene radicals containing ionogenic groups can be distributed either randomly or as blocks along the polymer chain.

The polymers can, for example, be prepared by copolymerization or cocondensation of monomers which are unsubstituted and monomers which are substituted with the side chains according to the invention. Advantageously, however, the novel substituted polymers are obtained by polymer-analogous reactions carried out on the organic polymers.

In the preferred polymers which contain aromatic structural elements, the side chains are advantageously introduced by Friedel-Crafts acylation. For this purpose, the polymer to be reacted is dissolved in a suitable solvent, eg. 1,2-dichloroethane, nitromethane or 2-nitropropane, and the Friedel-Crafts acylation is carried out with the desired amount of ω-chlorocarboxylic acid chloride. The conventional reaction conditions of from −10° to +50° C. and reaction times of from 2 to 4 hours are employed, the reaction being carried out in the presence of conventional catalysts, such as a molar amount of aluminum chloride, zinc chloride, tin(IV) chloride or boron trifluoride etherate.

After the catalyst/polymer complex has been decomposed, the polymer is isolated and in a second reaction step a keto group is reduced to the methylene group by reduction with hydrazine in alkaline triglycol. Any hydroxyl groups formed at the same time are reconverted to chlorine by treatment with thionyl chloride.

Catalytic reduction in the presence of platinum metal catalysts under hydrogen pressures of not more than 300 bar provides a gentler method of reducing the keto group to the methylene group.

If a sulfonic acid group is to be introduced, the chloroalkylated polymer is suspended in a solution of 1,4-dioxane and ethanol and reacted with thiourea over 10 hours, under reflux. Polymeric isothiuronium salt is filtered off, purified, and oxidized with 30 percent strength by weight hydrogen peroxide in the presence of sodium hydroxide at room temperature, with stirring. This method of synthesis is described in, for example, Makromol. Chem., Rapid Commun., 1, 1980, 297–302.

If a carboxyl group is to be introduced, the chloroalkylated polymer is reacted with potassium cyanide and the nitrile group is then hydrolyzed to the carboxylic acid group.

If a polymer intended for anion exchangers is to be prepared, the chloroalkylated polymer is reacted with, for example, trimethylamine.

A carboxyl group can also be introduced in a single step by reacting the main chain polymer with an unsaturated carboxylic acid possessing an olefinic double bond, eg. ω-undecenoic acid, in a Friedel-Crafts alkylation reaction under the conventional conditions for synthesis by such a reaction.

While the polymer-analogous reaction carried out on a dissolved polymer usually leads to a random distribution of the side chains, multiblock copolymers having a very regular structure can be obtained by carrying out the reaction on an undissolved, swollen, partially crystalline polymer. In that case, it is virtually only the amorphous regions of the partially crystalline polymer which are available for reaction. This approach is employed if high mechanical strength and high chemical resistance at high temperatures are required. Particularly suitable partially crystalline main chain polymers for synthesizing a multiblock structure are aromatic polyether-ketones. No organic solvents which dissolve these linear non-crosslinked polymers at below 300° C. are known. However, because of their partially crystalline structure, the polymers are capable of undergoing polymer-analogous reactions provided that they are in a swollen state. Particularly suitable swelling agents are nitromethane and 2-nitropropane. Once the polymer has been swollen, it can be subjected to the Friedel-Crafts synthesis. If, during subsequent reduction of the keto groups, some keto groups of the polymer main chain are also reduced, this is not disadvantageous.

Advantageously, these partially crystalline polymers are used in a form which has a large surface area. This is achieved by, for example, dissolving a polyetherketone in diphenylsulfone above 300° C. and reprecipitating it in a non-solvent. Short chopped fibers may also be used. In a preferred process, a film of 20-100 μm thickness is produced by extrusion through a slot die and is cut lengthwise into tapes, these tapes then being chopped into short pieces. This process has the advantage that optimum and reproducible control of the morphological structures is possible by adjustment of the process conditions, such as melt temperature, stretch ratio and chill roll temperature, and also by addition of samll amounts of nucleating agents, eg. from 0.0001 to 0.1% by weight of talc. Both the crystalline content and the size of macro-structures, eg. spherulites, may be controlled thereby.

Since the novel polymers which contain ionogenic groups bonded via alkylene groups are substantially non-crosslinked, they can in particular be converted to films by melt extrusion. To improve the mechanical properties, especially the tensile strength, it is advantageous to laminate the thermoplastic melt, when it has issued from the extruder slot die, to a fiber fabric, for example of glass or polytetrafluoroethylene. The dry membrane thickness can be, for example, from 30 μm to 300 μm.

To lower the melt viscosity, it is advantageous to add to the novel polymers low molecular weight plasticizers such as diphenylsulfone, sulfolan, N-methylpyrrolidone or N-cyclohexylpyrrolidone in a concentration of up to 20% by weight. After the polymer has been extruded, these processing assistants are advantageously extracted with water or ethanol.

In another procedure, the polymers, containing ionogenic groups bonded via alkylene radicals, are dissolved in suitable polar solvents, eg. dimethylformamide, N-methylpyrrolidone, sulfolan, N-methylacetamide, N.N-dimethylacetamide, benzyl alcohol, nitromethane, 2-nitropropane or mixtures of these, the solution thus obtained is cast, and the solvent is then evaporated to give a homogeneous membrane. In a modified procedure, microporous carrier membranes, for example of polypropylene, polyethylene or polytetrafluoroethylene, are impregnated with the above solution and the solvent is evaporated.

Using solutions of the polymers substituted according to the invention, it is also possible to produce asymmetric membranes by the phase inversion procedure conventionally used in membrane production. These asymmetric membranes have a very thin separating layer, of from 0.2 to 5 μm, and a correspondingly low electrical resistance. To produce them, the solution is, for example, applied by means of a doctor blade to a carrier belt, and the film of solution is passed through a drying tunnel for a period of varying length and then into a precipitation bath which contains a precipitant such as methanol, ethanol, water, hydrocarbons or mixtures of these.

The invention also relates to two-layer membranes composed of a membrane of substantially non-crosslinked organic polymers which contain cation-exchange groups bonded to the polymer chain via an alkylene radical, at intervals of not less than 4 carbon atoms, and a membrane of substantially non-crosslinked organic polymers which contain anion-exchange groups bonded to the polymer chain via an alkylene radical, at intervals of not less than 4 carbon atoms. Such two-layer membranes are also referred to as bipolar membranes. Advantageously, the two layers each consist of the same organic polymer matrix, to ensure better compatibility.

Because of the polymer being thermoplastically processable, bipolar membranes can be obtained reproducibly by, for example, melting the membrane polymers in two different extruders and combining the films, in the molten state, within a two-layer slot die. The cation exchange membrane and anion exchange membrane can also be thermally welded together by means of heated rolls or by ultrasonics.

In conjunction with monopolar membranes, bipolar membranes may be used to separate a salt MX into the acid HX and the base MOH by elctrodialysis. Prior art bipolar membranes are obtained, for example, by coagulating an emulsion of a cation exchange polymer on an anion exchange membrane, or vice versa. Such membranes have a relatively high surface resistance of around 13Ω/cm$^2$.

Against this, bipolar membranes according to the invention have substantially lower surface resistance, because of the different structure of the polymer and because of the thermoplastic welding of the cation exchange membrane and anion exchange membrane.

The Examples which follow illustrate the invention.

The electrical resistance of the membranes was measured by an indirect alternating voltage method (K. Hattenbach and K. Kneifel, Messung elektrochemischer Eigenschaften von Ionenaustauschermembranen (Measurement of Electrochemical Properties of Ion Exchange Membranes), GKSS Report 74/E/13, 1974).

The solid ion concentration was determined by exchange experiments, using the method of K. Kneifel, K.

Hattenbach and M. Arnold, GKSS Report 79/E/21, 1979.

The water content was determined by drying under reduced pressure at 50° C. The thickness of the swollen membranes was measured with a screw micrometer.

To measure the long-term stability and heat stability, the membranes were exposed to various media, such as 1N HCl, 1N NaOH and a solution of 0.1N $K_2CrO_4$, 1N HCl and 1N NaCl at 25° C. and 85° C. The constancy of the electrical resistance and of the solid ion concentration was taken as a measure of the stability.

EXAMPLES 1–10

The measurements were carried out on the membranes listed in Table 1, Examples 1–6 being according to the invention and Examples 7–10 according to the prior art.

Table 2 lists the results of the resistance measurements and stability measurements. They show that the ion exchange membranes according to the invention differ from conventional ion exchange membranes by having substantially lower resistance and improved stability, especially at elevated base concentrations and elevated temperatures.

membrane was produced by ultrasonic welding of the cation exchange membrane of Example 2 to the anion exchange membrane of Example 4. In a 1N NaCl solution, the bipolar membrane had a surface resistance of 1.8 $\Omega/cm^2$ at 25° C.

Using a membrane arrangement as shown in diagram 1, a 2N sodium sulfate solution was circulated in chambers 1, a mixture of 1N $Na_2SO_4$ and 1N $H_2SO_4$ in chambers 2 and a 1N NaOH solution in chambers 3, stock vessels and heat exchangers being employed in the circulation systems. The effective membrane area was 78 $cm^2$. The temperature in all chambers was kept at about 85° C. A current of 17.5 A was passed through the apparatus for a period of 2.3 hours, corresponding to a charge of 1.5 Faraday. The current intensity was kept constant by means of an electronic regulating unit.

Table 3 lists the concentrations and volumes for a bipolar membrane before and after the dialysis process.

It shows that the current yield for acid production was about 98% and that for base production about 99%.

The potential drop of the bipolar membrane was 1.33 volt. In total, the potential drop at the membranes (cations+anions+bipolar membrane) was about 1.7 volt, corresponding to an energy efficiency of about 40–50%.

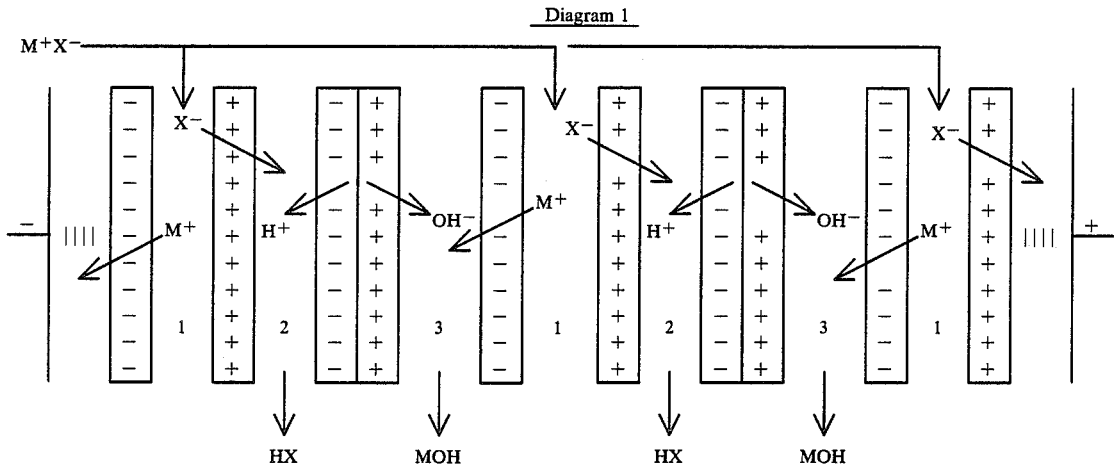

Diagram 1

EXAMPLE 11

Example 11 (Table 3) shows the performance of a bipolar membrane according to the invention. The

TABLE 1

| Example No. | Code and type | Main chain polymer | Length of $CH_2$ side chain (C atoms) | Ionogenic group | Solid ion concentration Equivalents/kg | Water content % | Thickness mm |
|---|---|---|---|---|---|---|---|
| 1 | | Polysulfone (1) | 6 | $N(CH_3)_3$ | 1.7 | 30 | 0.23 |
| 2 | | Polyether-sulfone (2) | 6 | $SO_3H$ | 1.9 | 33 | 0.42 |
| 3 | | Polyether-sulfone (2) | 7 | COOH | 1.9 | 29 | 0.35 |
| 4 | | Polyether-sulfone (2) | 6 | $N(CH_3)_3$ | 1.6 | 35 | 0.48 |
| 5 | | Polyether-ketone (3) | 12 | $SO_3H$ | 0.9 | 29 | 0.18 |
| 6 | | Polyether-ketone (3) | 13 | $SO_3H$ | 0.9 | 33 | 0.22 |
| 7 | C66-5T (Cation) (4) | Styrene/divinyl benzene copolymer | — | $SO_3H$ | 3.3 | 34 | 0.16 |
| 8 | 61 AZL 183 (Cation) (5) | Vinyl chloride/acrylonitrile copolymer | — | — | 2.0 | 40 | 0.6 |
| 9 | AMV (Anion) (6) | Styrene/butadiene copolymer | — | $N(CH_3)_3$ | 1.9 | 19 | 0.16 |
| 10 | 103 PZL 183 (Anion) (5) | Vinyl chloride/acrylonitrile copolymer | — | $N(CH_3)_3$ | 1.2 | 38 | 0.6 |

(1) Relative viscosity of a 1% strength solution in N—methylpyrrolidone at 25° C.: 1.7
(2) Relative viscosity of a 1% strength solution in N—methylpyrrolidone at 25° C.: 1.6
(3) Relative viscosity of a 0.5% strength solution in concentrated sulfuric acid at 25° C.: 1.65
(4) Tokuyama Soda Co. Ltd.
(5) Ionics Inc.
(6) Asahi Glass Co. Ltd.

TABLE 2

| Example No. | Resistance 1 N CaCl$_2$, 25° C. Ω·cm$^2$ | Time in hours until resistance rises and solid ion concentration drops, in various media and at various temperatures | | | | | |
|---|---|---|---|---|---|---|---|
| | | 1 N HCl | | 1 N NaOH | | 0.1 N K$_2$CrO$_4$/1 N HCl/1 N NaCl | |
| | | 25° C. | 85° C. | 25° C. | 85° C. | 25° C. | 85° C. |
| 1 | 0.8 | about 5,000 | about 500 | about 5,000 | about 150 | about 5,000 | about 500 |
| 2 | 0.7 | about 5,000 | about 500 | about 5,000 | about 500 | about 5,000 | about 500 |
| 3 | 0.5 | about 5,000 | about 500 | about 5,000 | about 500 | about 5,000 | about 500 |
| 4 | 0.9 | about 5,000 | about 500 | about 5,000 | about 200 | about 5,000 | about 500 |
| 5 | 0.7 | about 5,000 | about 500 | about 5,000 | about 500 | about 5,000 | about 500 |
| 6 | 0.6 | about 5,000 | about 500 | about 5,000 | about 500 | about 5,000 | about 500 |
| 7 | 1.5 | 500 | <5 | 600 | <5 | about 5,000 | about 100 |
| 8 | 4.5 | 2,000 | <5 | 600 | <5 | about 5,000 | about 200 |
| 9 | 5 | 2,000 | <5 | 10 | <1 | about 5,000 | about 100 |
| 10 | 5 | 2,000 | <5 | 10 | <1 | about 5,000 | about 5 |

TABLE 3

| | before | after |
|---|---|---|
| Volume flowing through chambers 1 (ml) | 2,350 | 2,208 |
| Volume flowing through chambers 2 (ml) | 950 | 1,029 |
| Acid concentration in chambers 2 | 1 N | 2.35 N |
| Volume flowing through chambers 3 (ml) | 1,155 | 1.098 |
| NaOH concentration in chambers 3 | 1 N | 2.40 N |

We claim:

1. An electrodialysis membrane which comprises: a substantially non-crosslinked acid and base resistant organic polymer containing aromatic structural elements and having a softening point above 80° C. and alkylene radicals bonded to the aromatic structural elements of the polymer chain, said alkylene radicals containing ionogenic groups attached to the alkylene radicals at intervals of not less than 4 carbon atoms from the polymer chain.

2. A membrane as defined in claim 1, which contains bonded tert.-amino groups or quaternary ammonium groups.

3. A membrane as defined in claim 1, which contains bonded carboxyl groups or sulfonic acid groups.

4. A membrane as defined in claim 1, which contains from 0.1 to 5 equivalents of ionogenic groups per kg of polymer.

5. A membrane as defined in claim 1, wherein the matrix polymer is an aromatic polysulfone or aromatic polyetherketone.

6. A membrane defined in claim 1, wherein the ionogenic groups are bonded to the polymer chain via an alkylene radical at intervals of at least 6 carbon atoms.

7. A membrane as defined in claim 1, which is composed of a layer of cation exchange membrane and a layer of anion exchange membrane.

* * * * *